United States Patent
Kim et al.

(10) Patent No.: US 10,419,366 B1
(45) Date of Patent: Sep. 17, 2019

(54) MECHANISM FOR COMMUNICATING TO REMOTE CONTROL PLANE FROM FORWARDING ELEMENT

(71) Applicant: Barefoot Networks, Inc., Santa Clara, CA (US)

(72) Inventors: Changhoon Kim, Palo Alto, CA (US); Xiaozhou Li, San Jose, CA (US); Anurag Agrawal, Santa Clara, CA (US); Julianne Zhu, Los Gatos, CA (US)

(73) Assignee: BAREFOOT NETWORKS, INC., Santa Clara, CA (US)

( * ) Notice: Subject to any disclaimer, the term of this patent is extended or adjusted under 35 U.S.C. 154(b) by 145 days.

(21) Appl. No.: 15/784,190

(22) Filed: Oct. 16, 2017

Related U.S. Application Data

(60) Provisional application No. 62/452,364, filed on Jan. 31, 2017.

(51) Int. Cl.
*H04L 12/861* (2013.01)
*H03M 13/09* (2006.01)
(Continued)

(52) U.S. Cl.
CPC .......... *H04L 49/90* (2013.01); *H03M 13/096* (2013.01); *H04L 41/08* (2013.01); *H04L 45/7453* (2013.01); *H04L 41/06* (2013.01)

(58) Field of Classification Search
CPC ..... H04L 49/90; H04L 41/08; H04L 41/0803; H04L 41/0813; H04L 41/0816;
(Continued)

(56) References Cited

U.S. PATENT DOCUMENTS 8,693,374 B1 * 4/2014 Murphy .................. H04L 12/28
370/255
9,450,817 B1 * 9/2016 Bahadur ................. H04L 45/64
(Continued)

OTHER PUBLICATIONS

Non-Published Commonly Owned U.S. Appl. No. 15/784,191, filed Oct. 16, 2017, 36 pages, Barefoot Networks, Inc.
(Continued)

*Primary Examiner* — Greg C Bengzon
(74) *Attorney, Agent, or Firm* — Adeli LLP

(57) ABSTRACT

Some embodiments of the invention provide a forwarding element that can be configured through in-band data-plane messages from a remote controller that is a physically separate machine from the forwarding element. The forwarding element of some embodiments has data plane circuits that include several configurable message-processing stages, several storage queues, and a data-plane configurator. A set of one or more message-processing stages of the data plane are configured (1) to process configuration messages received by the data plane from the remote controller and (2) to store the configuration messages in a set of one or more storage queues. The data-plane configurator receives the configuration messages stored in the set of storage queues and configures one or more of the configurable message-processing stages based on configuration data in the configuration messages.

20 Claims, 8 Drawing Sheets

(51) Int. Cl.
*H04L 12/743* (2013.01)
*H04L 12/24* (2006.01)

(58) Field of Classification Search
CPC .............. H04L 41/082; H04L 41/0823; H04L 41/0836; H04L 41/0866; H04L 41/0869; H04L 41/0873; H04L 41/0876; H04L 41/0886; H04L 49/70; H04L 51/18; H04L 51/30; H04L 45/7453; H04L 41/06; H04L 45/60; H04L 12/28; H04L 1/22; H04L 43/0811; H04L 43/10; H04L 43/50; H04L 45/124; H04L 45/18; H04L 45/42; H04L 45/50; H04L 49/101; H04L 49/106; H04L 49/109; H04L 49/40; H04L 49/602; H04L 69/40; H04L 47/12; H04L 67/125; H04L 41/046; H04L 41/0893; H04L 41/20; H04L 43/062; H04L 43/0829; H04L 43/0835; H04L 43/0858; H04L 47/122; H04L 47/20; H04L 47/24; H04L 49/3063; H04L 67/327; H03M 13/096
See application file for complete search history.

(56) References Cited

U.S. PATENT DOCUMENTS

| | | | | |
|---|---|---|---|---|
| 9,467,363 | B2* | 10/2016 | Gao | H04L 45/18 |
| 9,838,268 | B1* | 12/2017 | Mattson | H04L 41/32 |
| 2006/0072480 | A1* | 4/2006 | Deval | H04L 1/22 |
| | | | | 370/254 |
| 2006/0092857 | A1* | 5/2006 | Ansari | H04L 45/02 |
| | | | | 370/254 |
| 2010/0135158 | A1* | 6/2010 | Adams | H04L 47/10 |
| | | | | 370/235 |
| 2010/0238812 | A1* | 9/2010 | Boutros | H04L 45/00 |
| | | | | 370/249 |
| 2012/0159235 | A1* | 6/2012 | Suganthi | G06F 11/2028 |
| | | | | 714/4.11 |
| 2012/0170585 | A1* | 7/2012 | Mehra | H04L 45/24 |
| | | | | 370/400 |
| 2012/0284438 | A1* | 11/2012 | Zievers | G06F 17/5027 |
| | | | | 710/104 |
| 2013/0003556 | A1* | 1/2013 | Boden | H04L 49/3063 |
| | | | | 370/238 |
| 2013/0108264 | A1* | 5/2013 | deRuijter | H04Q 3/0083 |
| | | | | 398/45 |
| 2014/0244966 | A1* | 8/2014 | Bosshart | H04L 49/90 |
| | | | | 711/206 |
| 2014/0269432 | A1* | 9/2014 | Goyal | H04L 49/354 |
| | | | | 370/255 |
| 2015/0009796 | A1* | 1/2015 | Koponen | H04L 41/0873 |
| | | | | 370/216 |
| 2015/0142932 | A1* | 5/2015 | Hallivuori | H04L 41/0803 |
| | | | | 709/220 |
| 2015/0156288 | A1 | 6/2015 | Lu et al. | |
| 2015/0319086 | A1* | 11/2015 | Tripathi | H04W 12/06 |
| | | | | 370/254 |
| 2015/0363522 | A1 | 12/2015 | Maurya | |
| 2015/0381418 | A1* | 12/2015 | Fausak | H04L 41/0813 |
| | | | | 709/221 |
| 2016/0014073 | A1* | 1/2016 | Reddy | H04L 67/38 |
| | | | | 713/2 |
| 2016/0149784 | A1* | 5/2016 | Zhang | H04B 1/0003 |
| | | | | 370/229 |
| 2016/0173371 | A1* | 6/2016 | Bays | H04L 45/42 |
| | | | | 370/389 |
| 2016/0212012 | A1* | 7/2016 | Young | H04L 41/14 |
| 2016/0241459 | A1* | 8/2016 | Zheng | H04L 45/38 |
| 2016/0342510 | A1* | 11/2016 | Pani | G06F 12/0615 |
| 2016/0344629 | A1* | 11/2016 | Gray | H04L 45/60 |
| 2017/0013452 | A1 | 1/2017 | Mentze et al. | |
| 2017/0041209 | A1* | 2/2017 | Joshi | H04L 45/64 |
| 2017/0118041 | A1* | 4/2017 | Bhattacharya | H04L 12/462 |
| 2017/0195229 | A1* | 7/2017 | Ulas | H04L 47/122 |
| 2017/0220499 | A1* | 8/2017 | Gray | G06F 13/36 |
| 2017/0251077 | A1* | 8/2017 | Kumar Eerpini | H04L 67/327 |
| 2018/0124183 | A1* | 5/2018 | Kozat | H04L 41/046 |

OTHER PUBLICATIONS

Non-Published Commonly Owned U.S. Appl. No. 15/784,192, filed Oct. 16, 2017, 36 pages, Barefoot Networks, Inc.

* cited by examiner

MECHANISM FOR COMMUNICATING TO REMOTE CONTROL PLANE FROM FORWARDING ELEMENT

BACKGROUND

Today, forwarding elements commonly have control and data plane components. A forwarding element's control plane component often provides the interface for configuring the components of the data plane, while the data plane handles the forwarding of the data messages that the forwarding element receives. The data plane is often referred to as the forwarding plane. The data plane often is a custom-made application specific integrated circuit (ASIC) that includes multiple ingress pipelines, multiple egress pipelines, and a switching fabric between the ingress and egress pipelines. The control plane, on the other hand, is typically managed by one or more off-the-shelf processors, which supports the interface for locally or remotely receiving parameters for configuring the forwarding element.

Control plane processors can fail, and such failures can cause the forwarding elements to fail. Also, these processors add to the expense of the forwarding element. High-end processors not only cost more, but often require additional expensive components, such as high-end cooling systems, etc.

SUMMARY

Some embodiments of the invention provide a forwarding element that can be configured through in-band data-plane messages from a remote controller that is a physically separate machine from the forwarding element. The forwarding element of some embodiments has data plane circuits that include several configurable message-processing stages, several storage queues, and a data-plane configurator. A set of one or more message-processing stages of the data plane is configured (1) to process configuration messages received by the data plane from the remote controller and (2) to store the configuration messages in a set of one or more storage queues. The data-plane configurator receives the configuration messages stored in the set of storage queues and configures one or more of the configurable message-processing stages based on configuration data in the configuration messages.

In some embodiments, the configurable message-processing stages of the data plane include several ingress processing pipelines, several egress processing pipelines, and a traffic management stage between the ingress and egress processing pipelines. The traffic management stage in some embodiments includes the set of storage queues that store the configuration messages that the data-plane configurator receives. Also, in some embodiments, at least one ingress pipeline comprises a set of match-action units (MAUs) that processes configuration messages from the remote controller to convert the configuration messages from a packet-in first format to a second format for processing by the data-plane configurator. This set of MAUs in some embodiments also process other data messages as part of the data plane's forwarding operations that are needed for the forwarding element to forward data messages to their destinations or their next hop (e.g., the next forwarding element).

The data-plane configurator in some embodiments examines a configuration message to determine whether it has been corrupted, and if so, it drops the message. The configurator determines whether a data message is corrupted differently in different embodiments. For instance, in some embodiments, the data-plane configurator computes a checksum for the received message, and drops the message when the checksum indicates that the message has been corrupted. In other embodiments, the data-plane configurator performs a cyclic redundancy check (CRC) operation on the received message, and drops the message when the CRC operation indicates that the message has been corrupted. In still other embodiments, the configurator performs both checksum and CRC operations to determine whether the received message has been corrupted.

To perform a checksum operation, the data-plane configurator verifies a checksum value computed by a message-processing stage for a configuration message that the configurator receives. For instance, in some embodiments, an ingress pipeline includes a parser that extracts data from headers of the configuration messages and inserts the extracted data into message header vectors for processing by the set of MAUs. In some of these embodiments, at least one MAU in the set of MAUs computes an expected checksum value for a payload of a received message by computing a checksum of the message header and differentiating (e.g., differencing or subtracting) this computed checksum from a message checksum that was stored by the remote controller in the message header. This MAU then stores this expected checksum in the message's header vector. The data configurator then computes actual checksum value for the payload of the message and discards the message when its computed actual checksum value does not match the expected checksum value computed by the MAU.

The data-plane configurator checks the messages from the remote controller for data corruption in order to ensure reliable data plane communication between the remote controller and the configurator. To ensure reliable communication, the configurator also drops messages that do not include the appropriate transaction identifiers. Specifically, in some embodiments, the remote controller and the forwarding element insert session and transaction identifiers in the inner headers of the messages that they exchange, in order to ensure reliable data plane communication. In some embodiments, each session corresponds to a task that the forwarding element or the remote controller has to perform, and each session includes one or more transactions. A session identifier identifies each session, while a transaction identifier identifies each transaction. In some embodiments, the configurator drops any message when the message contains a transaction identifier that does not follow the transaction identifier of the previous message in the same session.

After processing a configuration message, the data-plane configurator in some embodiments generates a response message to the remote controller and supplies the response message to the message-processing stages to process and forward to the remote controller through intervening network fabric. In some embodiments, the data-plane circuit generates a first replicated message by replicating the response message for recirculating through the message-processing stages until the remote controller acknowledges receiving the response message, at which time the first replicated response message is discarded.

For instance, in the embodiments where the configurable message-processing stages includes the ingress and egress pipelines and the traffic management stage, the first replicated message is periodically stored in a rate-limited storage queue in the traffic management stage as the first replicated message recirculates through the ingress pipeline stage, the traffic management stage and the egress pipeline stage. In some of these embodiments, one of the message-processing stages (e.g., one of the MAUs) in the ingress pipeline designates a header vector associated with the data-plane configurator's response message (e.g., stores a particular value in this header vector) to direct the traffic management stage to replicate this message for recirculation.

When no acknowledgement is received from the remote controller within a duration of time, a message processing stage of the data-plane circuit modifies the first replicated message to generate a second replicated message addressed to the remote controller for retransmission of the configurator's response message to the remote controller. In some embodiments, the data-plane circuit first sends a notification to the data-plane configurator regarding the lack of response, and the data-plane configurator then directs the data-plane circuit to generate the second replicated message to send to the remote controller.

When the data-plane configurator has to provide a transport-layer acknowledgment message to the remote controller to acknowledge receiving a configuration message from the remote controller, the data-plane configurator in some embodiments provides the transport-layer acknowledgement by piggybacking this acknowledgement message in the response message that the data-plane configurator generates and provides to the message-processing stages for forwarding to the remote controller. In some of these embodiments, the response message has the same transaction and session identifiers as the remote-controller message to which it responds. In other embodiments, the configurator only embeds the session identifier in the response message, and not the transaction identifier.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF FIGURES

The novel features of the invention are set forth in the appended claims. However, for purposes of explanation, several embodiments of the invention are set forth in the following figures.

DETAILED DESCRIPTION

Figure 1:
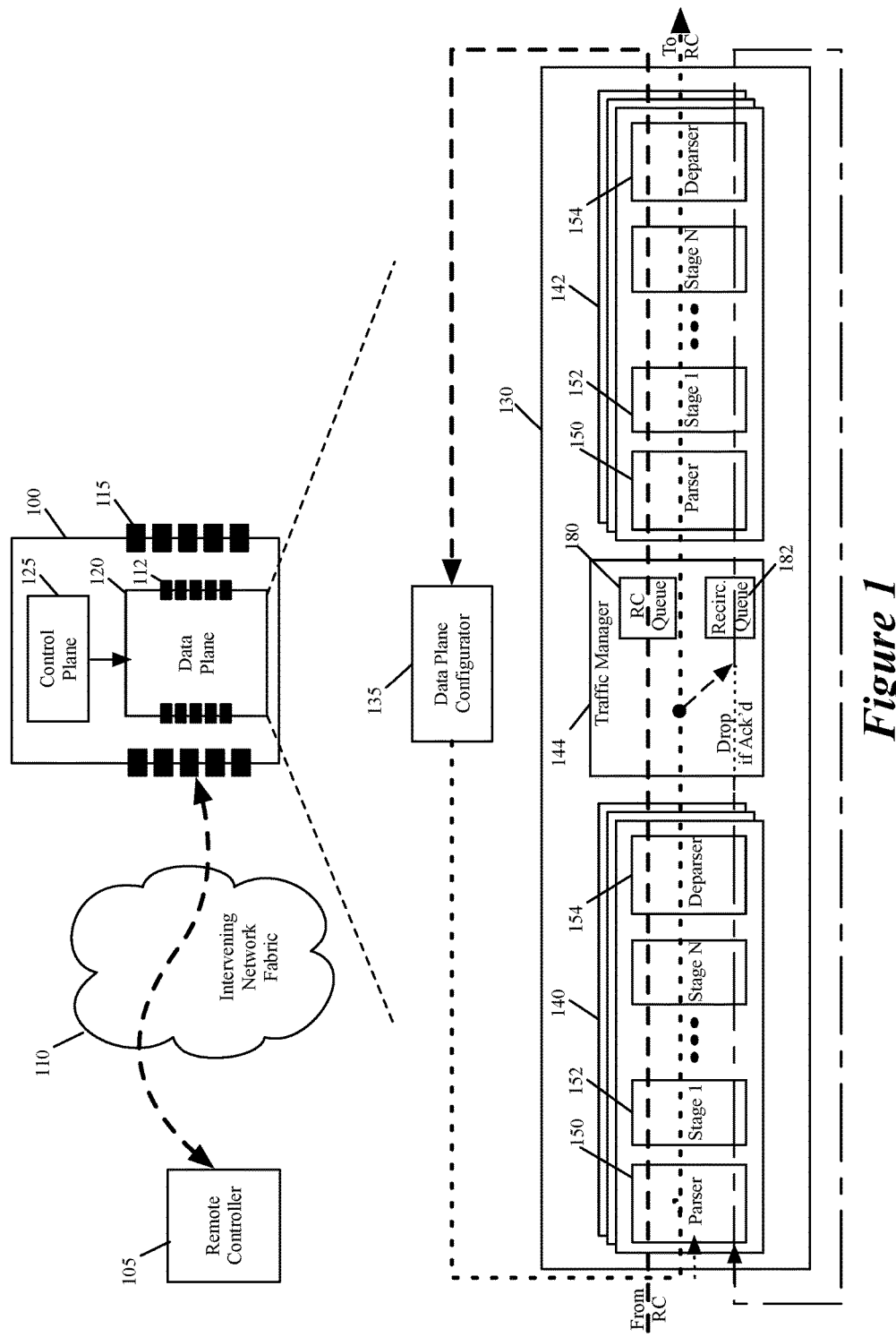
FIG. 1 illustrates an example of a forwarding element with a data plane that is programmable through in-band data messages from a remote controller.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a forwarding element that can be configured through in-band data-plane messages from a remote controller that is a physically separate machine (e.g., a virtual machine or a standalone machine) from the forwarding element. The forwarding element of some embodiments has data plane circuits that include several configurable message-processing stages, several storage queues, and a data-plane configurator. A set of one or more message-processing stages of the data plane is configured (1) to process configuration messages received by the data plane from the remote controller and (2) to store the configuration messages in a set of one or more storage queues. The data-plane configurator receives the configuration messages stored in the set of storage queues and configures one or more of the configurable message-processing stages based on configuration data in the configuration messages.

As used in this document, data messages refer to a collection of bits in a particular format sent across a network. One of ordinary skill in the art will recognize that the term data message may be used herein to refer to various formatted collections of bits that may be sent across a network, such as Ethernet frames, IP packets, TCP segments, UDP datagrams, etc. Also, as used in this document, references to L2, L3, L4, and L7 layers (or layer 2, layer 3, layer 4, layer 7) are references respectively to the second data link layer, the third network layer, the fourth transport layer, and the seventh application layer of the OSI (Open System Interconnection) layer model.

FIG. 1 illustrates an example of one such forwarding element 100 that can be configured through in-band data plane data messages from a remote controller 105, which communicates with the forwarding element through intervening network fabric 110. The forwarding element 100 can be any type of forwarding element in a network, such as a switch, a router, a bridge, etc., or any type of middlebox appliance in the network. The remote controller 105 is a separate device, or executes on a separate device than, the forwarding element 100. The intervening network fabric 110 includes one or more forwarding devices (such as switches, routers, other network devices, etc.).

The forwarding element 100 forwards data messages within a network. The forwarding element 100 can be deployed as non-edge forwarding element in the interior of a network, or can be deployed as an edge forwarding element at the edge of the network to connect to compute devices (e.g., standalone or host computers) that serve as sources and destinations of the data messages. As a non-edge forwarding element, the forwarding element 100 forwards data messages between forwarding elements in the network, while as an edge forwarding element, the forwarding element 100 forwards data messages to and from edge compute device to each other, to other edge forwarding elements and to non-edge forwarding elements.

Figure 2:
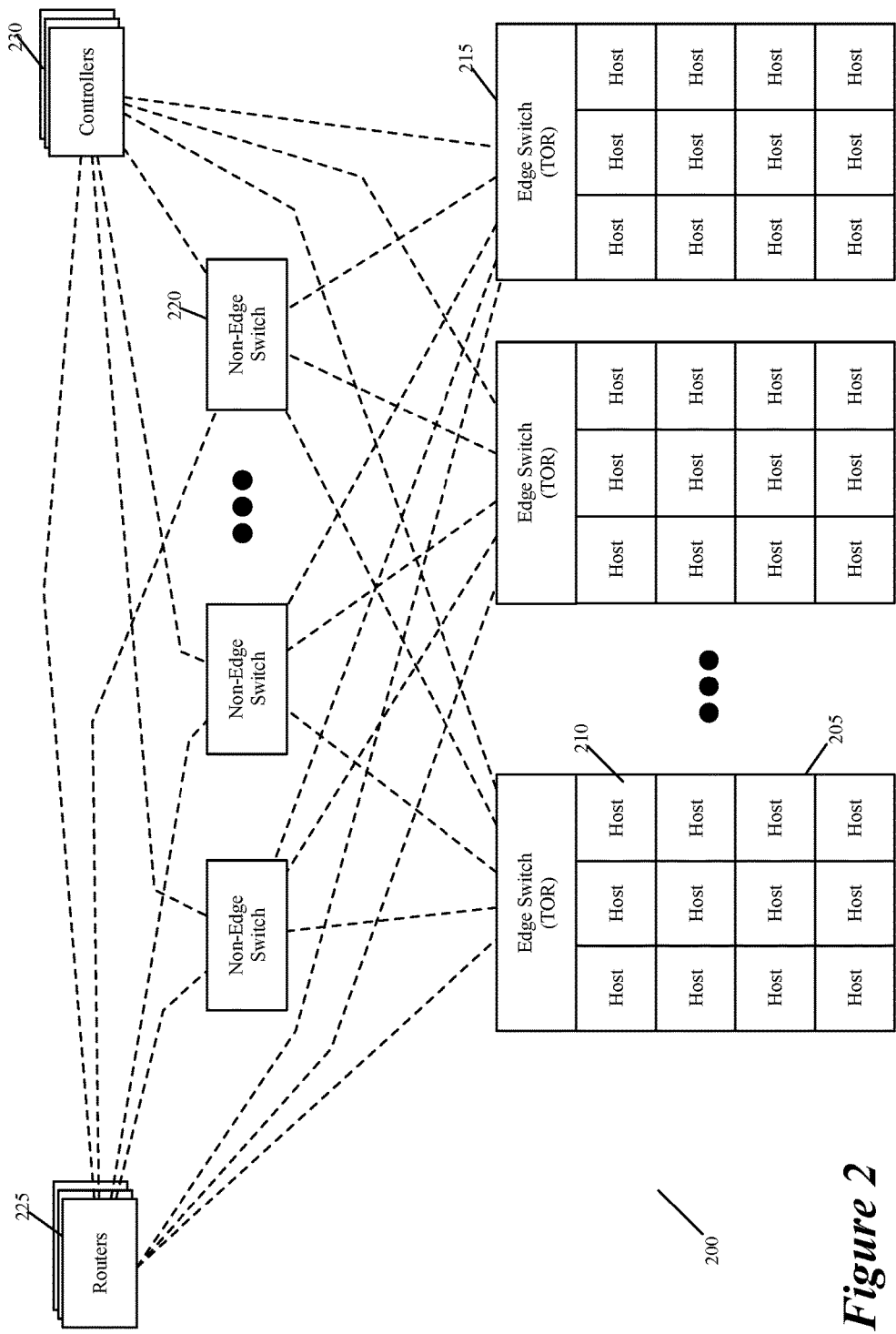
FIG. 2 illustrates an example of a network that contains the forwarding elements of some embodiments at different locations and for performing different forwarding operations.

FIG. 2 illustrates an example of a network 200 that includes several forwarding elements 100 at the edge and non-edge locations of the network to perform different operations. This network has multiple racks 205 of host computers 210, with each rack having a top-of-rack (TOR) switch 215 that is an edge switch. The TOR switches are connected by several spine switches 220, which are non-edge forwarding elements. The TOR and spine switches also connect to several routers 225, which are also non-edge forwarding elements. Each TOR switch 215, spine switch 220 and router 225 can be implemented by an in-band, programmable forwarding element 100. As such a forwarding element, each of these switches 215 or 220 and/or routers 225 can be programmed remotely by one or more remote controllers 230 through in-band data messages from these controllers that are processed by the data plane circuits of these forwarding elements 215, 220, and 225 without resorting to the control plane circuits of these forwarding elements.

As shown in FIG. 1, the forwarding element 100 includes (1) physical ports 115 that receive data messages from, and transmit data messages to, devices outside of the forwarding element, (2) a data-plane forwarding circuit ("data plane") 120 that perform the forwarding operations of the forwarding element 100 (e.g., that receive data messages and forward the data messages to other devices), and (3) a control-plane circuit ("control plane") 125 that provides a configuration interface for configuring the forwarding behavior of the data plane forwarding circuit.

As further shown, the data plane 120 includes ports 112, configurable message processing circuits 130 and a data-plane configurator 135. In some embodiments, several ports 112 receive data messages from and forward data messages to ports 115 of the forwarding element 100. For instance, in some embodiments, N data-plane ports 112 (e.g., 4 ports 112) are associated with each port 115 of the forwarding element. The N-ports 112 for each port 115 are viewed as N-channels of the port 115. In some embodiments, several data-plane ports 112 are associated with other modules (e.g., data plane configurator) of the data plane 120.

The configurable message-processing circuits 130 perform the configurable data-plane forwarding operations of the forwarding element to process and forward data messages to their destinations. The data-plane configurator 135 can configure the configurable message-processing circuits 130 based on configuration data supplied by the control-plane circuit 125. The data-plane configurator 135 can also configure these circuits 130 based on configuration data messages that the data plane 120 receives in-band from the remote controller 105. As further described below, one or more messages-processing circuits of the data plane are configured (1) to process configuration messages received by the data plane from the remote controller and (2) to store the configuration messages in a set of one or more storage queues. The data-plane configurator receives the configuration messages stored in the set of storage queues and configures one or more of the configurable message-processing circuits based on configuration data in the configuration messages.

In some embodiments, the configurable message-forwarding circuits 130 of the data plane include several ingress processing pipelines 140, several egress processing pipelines 142, and a traffic management stage 144 between the ingress and egress processing pipelines 140 and 142. In some embodiments, each ingress or egress pipeline is associated with one or more physical ports 115 of the forwarding element 100. Also, in some embodiments, each ingress or egress pipeline is associated with several data-plane ports 112.

Also, in some embodiments, each ingress or egress pipeline includes a parser 150, several message-processing stages 152, and a deparser 154. A pipeline's parser 150 extracts a message header from a data message that the pipeline receives for processing. In some embodiments, the extracted header is in a format of a header vector (HV), which can be modified by successive message processing stages as part of their message processing operations. The parser of a pipeline passes the payload of the message to the deparser 154 as the pipeline's message-processing stages 152 operate on the header vectors. When a pipeline finishes processing a data message and the message has to be provided to the traffic management stage 144 (in case of an ingress pipeline) or to a port 112 to forward to a port 115 (in case of an egress pipeline) to be forwarded to the message's next hop (e.g., to its destination compute node or next forwarding element), a deparser of the pipeline in some embodiments produces the data message header from the message's header vector that was processed by the last message processing stage, and combines this header with the data message's payload.

Figure 3:
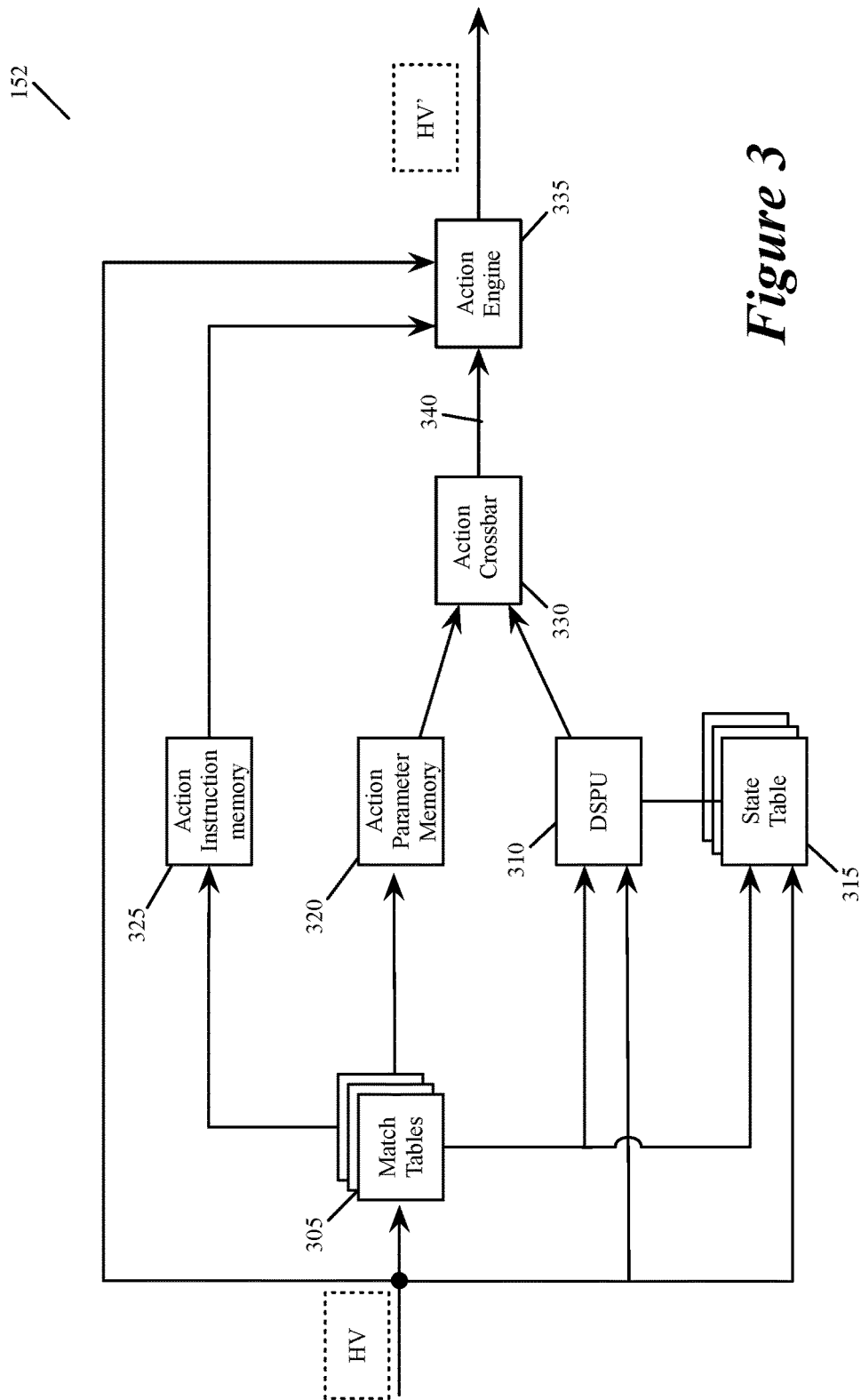
FIG. 3 illustrates a message-processing stage within a data plane of some embodiments.

In an ingress or egress pipeline, each message-processing stage includes message-processing circuitry for processing received data messages by performing one or more operations based on header vectors associated with the data messages. FIG. 3 illustrates an example of a match-action unit (MAU) 152 of some embodiments. As mentioned above, an ingress pipeline 140 or egress pipeline 142 in some embodiments has several MAU stages 152, each of which includes message-processing circuitry for forwarding received data messages and/or performing stateful operations based on these data messages. An MAU performs these operations by processing values stored in the header vectors of the data messages, as received from the message parser 150 or from a previous MAU 152 in its message processing pipeline.

As shown in FIG. 3, the MAU 152 in some embodiments has a set of one or more match tables 305, a data plane stateful processing unit 310 (DSPU), a set of one or more stateful tables 315, an action crossbar 330, an action parameter memory 320, an action instruction memory 325, and an action engine 335. The match table set 305 can compare one or more fields in a received message's header vector (HV) to identify one or more matching flow entries (i.e., entries that match the message's HV). The match table set can be TCAM tables or exact match tables in some embodiments. In some embodiments, the match table set can be accessed at an address that is a value extracted from one or more fields of the message's header vector, or it can be a hash of this extracted value.

In some embodiments, the value stored in a match table record that matches a message's flow identifier, or that is accessed at a hash-generated address, provides addresses for the action parameter memory 320 and action instruction memory 325. Also, such a value from the match table can provide an address and/or parameter for one or more records in the stateful table set 315, and can provide an instruction and/or parameter for the DSPU 310. As shown, the DSPU 310 and the stateful table set 315 also receive a processed message's header vector. The header vectors can include instructions and/or parameters for the DSPU, while containing addresses and/or parameters for the stateful table set 315.

The DSPU 310 and the stateful table set 315 form the MAU's stateful sub-unit 312, which performs stateful operations, such as maintaining data regarding acknowledgments and calculating statistics regarding how often data messages are re-circulated. The DSPU 310 in some embodiments performs one or more stateful operations, while a stateful table 315 stores state data used and generated by the DSPU 310. In some embodiments, the DSPU includes one or more programmable arithmetic logic units (ALUs) that perform operations synchronously with the dataflow of the message-processing pipeline (i.e., synchronously at the line rate). As such, the DSPU can process a different header vector on every clock cycle, thus ensuring that the DSPU would be able to operate synchronously with the dataflow of the message-processing pipeline. In some embodiments, a DSPU performs every computation with fixed latency (e.g., fixed number of clock cycles). Examples of such operations in some embodiments include maintaining statistics (e.g., counts) about how often packets are re-circulated, as further described below.

The DSPU 310 output a set of action parameters to the action crossbar 330. The action parameter memory 320 also outputs a set of action parameters to this crossbar 330. The action parameter memory 320 retrieves the action parameter that it outputs from its record that is identified by the address provided by the match table set 305. The action crossbar 330 in some embodiments maps the action parameters received from the DSPU 310 and action parameter memory 320 to an action parameter bus 340 of the action engine 335. This bus provides the set of action parameters to the action engine 335. For different data messages, the action crossbar 330 can map the action parameters from DSPU 310 and memory 320 differently to this bus 340. The crossbar can supply the action parameters from either of these sources in their entirety to this bus 340, or it can concurrently select different portions of these parameters for this bus in some embodiments.

The action engine 335 also receives a set of instructions to execute from the action instruction memory 325. This memory 325 retrieves the instruction set from its record that is identified by the address provided by the match table set 305. The action engine 335 also receives the header vector for each message that the MAU processes. Such a header vector can also contain a portion or the entirety of an instruction set to process and/or a parameter set for processing the instruction set. In some embodiments, the data-plane configurator supplies flow entries (e.g., the ACL flow-match identifiers and/or action identifiers) in one or more MAU tables (e.g., at the direction of the local control plane 125 and/or the remote controller 105).

The action engine 335 in some embodiments includes a parameter multiplexer and a very large instruction word (VLIW) processor. In some embodiments, the VLIW processor is a set of one or more ALUs. In some embodiments, the parameter multiplexer receives the parameter sets from the action crossbar 330 and input header vector and outputs the parameters as operands to the VLIW processor according to the instruction set (from the instruction memory 335 or the header vector). The VLIW processor executes instructions (from the instruction memory 335 or the header vector) applied to operands received from the parameter multiplexer. The action engine 335 stores the output of its operation in the header vector in order to effectuate a message forwarding operation and/or stateful operation of its MAU stage 152. The output of the action engine 335 forms a modified header vector (HV') for the next MAU stage.

In other embodiments, the match tables 305 and the action tables 315, 320 and 325 of the MAU stage 152 can be accessed through other methods as well. For instance, in some embodiments, each action table 315, 320 or 325 can be addressed through a direct addressing scheme, an indirect addressing scheme, and an independent addressing scheme. The addressing scheme that is used depends on the configuration of the MAU stage, which in some embodiments, is fixed for all data messages being processed, while in other embodiments can be different for different data messages being processed.

In the direct addressing scheme, the action table uses the same address that is used to address the matching flow entry in the match table set 305. As in the case of a match table 305, this address can be a hash generated address value or a value from the header vector. Specifically, the direct address for an action table can be a hash address that a hash generator (not shown) of the MAU generates by hashing a value from one or more fields of the message's header vector. Alternatively, this direct address can be a value extracted from one or more fields of the header vector.

On the other hand, the indirect addressing scheme accesses an action table by using an address value that is extracted from one or more records that are identified in the match table set 305 for a message's header vector. As mentioned above, the match table records are identified through direct addressing or record matching operations in some embodiments.

The independent address scheme is similar to the direct addressing scheme except that it does not use the same address that is used to access the match table set 305. Like the direct addressing scheme, the table address in the independent addressing scheme can either be the value extracted from one or more fields of the message's header vector, or it can be a hash of this extracted value. In some embodiments, not all the action tables 315, 320 and 325 can be accessed through these three addressing schemes, e.g., the action instruction memory 325 in some embodiments is accessed through only the direct and indirect addressing schemes.

The traffic management stage 144 provides the hardware switching fabric that directs a data message from one ingress pipeline 140 to an egress pipeline 142 (e.g., an egress pipeline associated with the forwarding-element port 115 from which the data message has to exit the data plane). This stage also has numerous queues for storing the data messages, and through these queues and their associated scheduling, this stage can perform quality of service (QoS) operations in order to ensure the desired throughput and service through the forwarding element.

Figure 4:
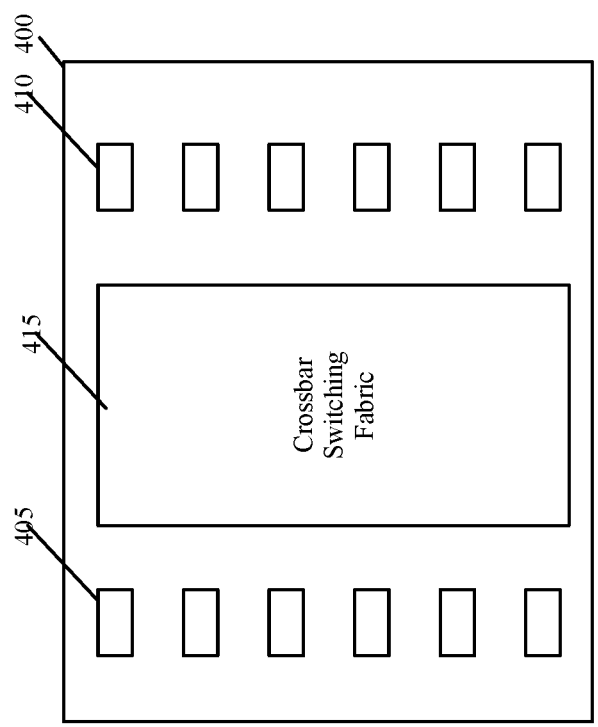
FIG. 4 illustrates a traffic manager of a data plane of some embodiments.

FIG. 4 illustrates an example of the traffic management stage 144 of some embodiments. As shown, the traffic manager 400 includes ingress queues 405, egress queues 410 and hardware switching fabric 415 between the ingress and egress queues. In some embodiments, each ingress queue is associated with an ingress pipeline 140, while each egress queue is associated with an egress pipeline 142.

The switching fabric 415 directs a data message from an ingress queue 405 of an ingress pipeline 140 to an egress queue 410 of an egress pipeline 142. In some embodiments, the switching fabric is a crossbar switching fabric that forwards messages from ingress pipelines to egress pipelines based on header vector parameters that the ingress processing pipelines can modify while processing the messages. As further described below, some embodiments use two or more queues (e.g., egress queues 410) of the traffic manager to store data plane data messages (that contain control-plane instruction and data) exchanged between the remote controller 105 and the data-plane configurator 135. In some embodiments, the data-plane configurator can specify the rates for data message inflow and/or outflow from the one or more queues in the traffic manager (e.g., at the direction of the local control plane 125 and/or the remote controller 105).

As mentioned above, the data plane 120 not only processes data messages received by the forwarding element to forward the messages to their next hops, but also processes and passes data messages (that contain control-plane instructions and/or data) between the remote controller 105 and the data-plane configurator 135. Through the data messages exchanged with the data-plane configurator 135, the remote controller 105 can direct the data-plane configurator 135 to configure the data plane 120 (e.g., to write ACL flow entries in the MAU tables, to configure queues in the TM, to provide instructions to the DSPUs, etc.).

Figure 5:
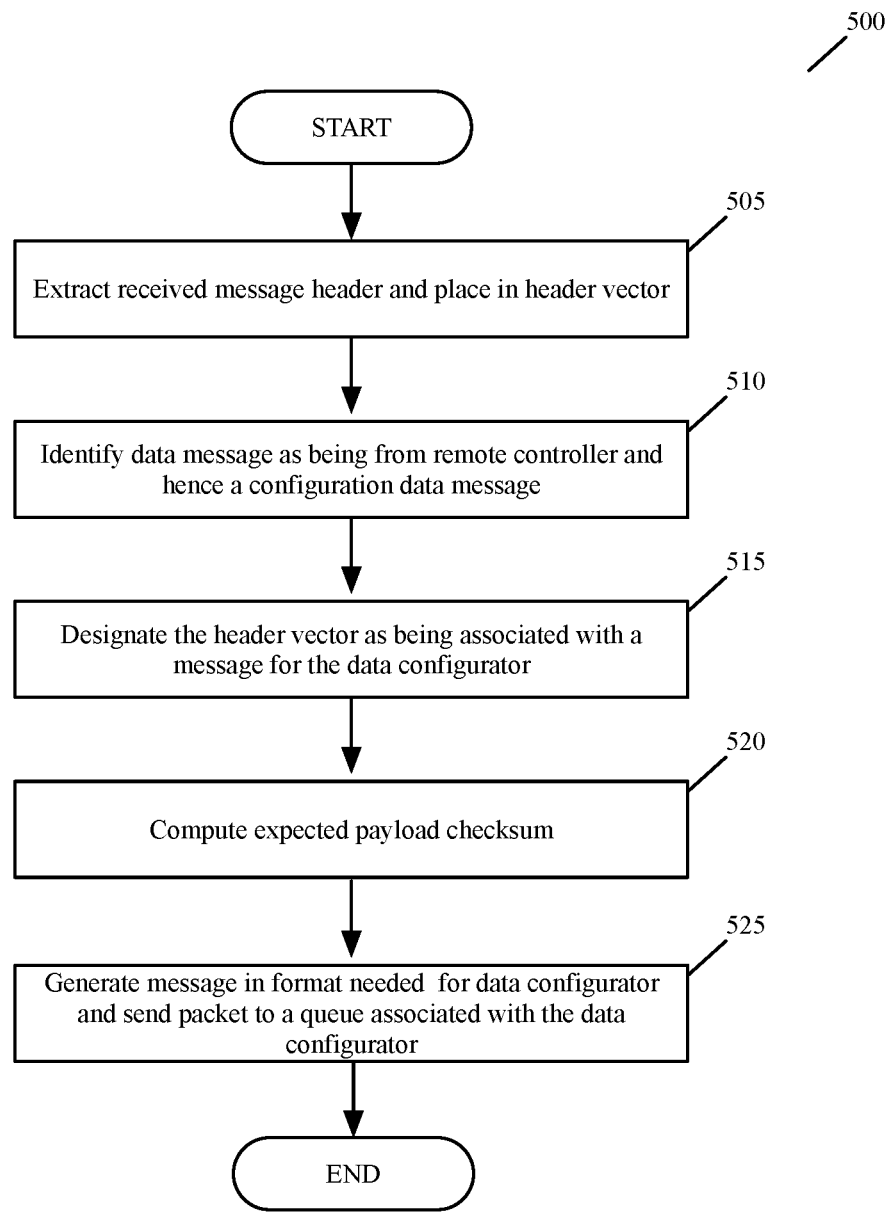
FIG. 5 presents a process that illustrates the operations that an ingress pipeline in the data plane performs in some embodiments to forward a data message from the remote controller to a data-plane configurator.

To forward a data message from the remote controller 105 to the data-plane configurator 135, the ingress pipelines 140 perform several operations that are illustrated in FIG. 5. As shown, a parser 150 of an ingress pipeline 140 initially extracts (at 505) the received message's header and creates a header vector for processing by message processing stages 152.

Figure 6:
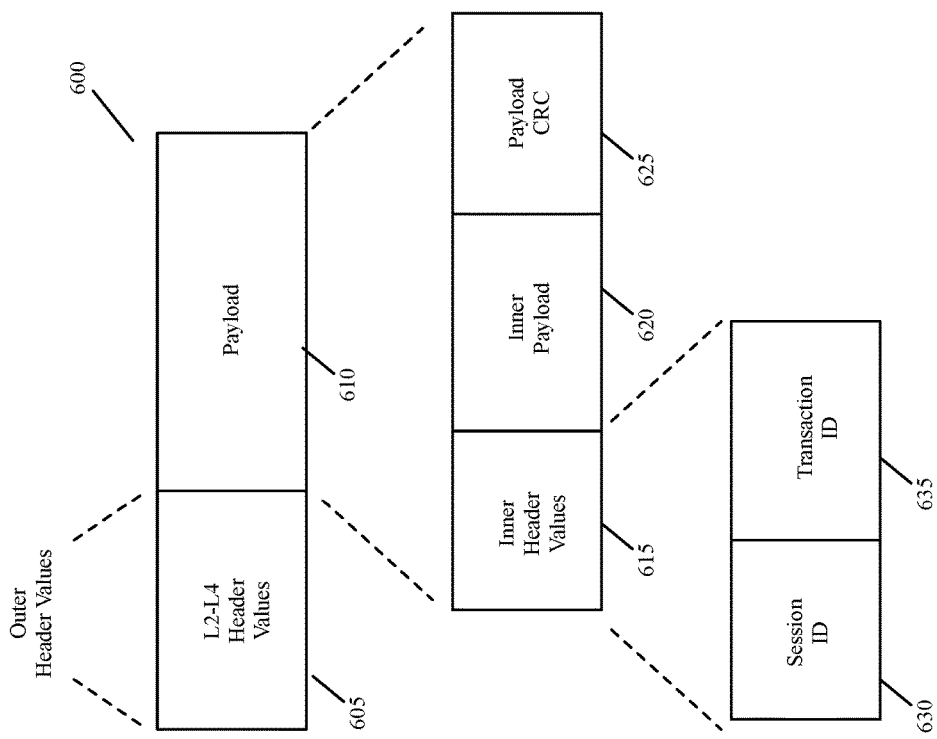
FIG. 6 illustrates the message format of a data message that the remote controller sends in-band to the data-plane configurator.

FIG. 6 illustrates the message format of a data message 600 that the remote controller 105 sends in-band to the data-plane configurator 135. The forwarding element 100 uses the same message format when forwarding a message from the configurator 135 to the remote controller 105. As shown, the message has an outer header 605 and a payload 610. The outer header 605 includes layer 2 to layer 4 (L2-L4) address values that are needed for directing the data message from the remote controller 105 to the forwarding element 100 through any intervening network fabric 110. The message-processing stages 152 and the data-plane configurator 135 in some embodiments are agnostic to outer header formats. Different outer headers (e.g., TCP or UDP with SEQ/ACK, L2/L3 or source routing, etc.) are used in different deployments. In some embodiments, the outer headers contain transport layer sequence and acknowledgement numbers.

When the data message is from the controller 105 to the configurator 135, the payload 610 of the outer header 605 is provided to the L4 application process (e.g., the TCP process) of the configurator. As shown in FIG. 6, the payload 610 includes an inner header 615, an inner payload 620, and a payload CRC value 625. The inner header 615 includes control application parameters that the remote controller 105 and data-plane configurator 135 need to identify the session and the transaction within the session. In some embodiments, each task that the configurator 135 or controller 105 has to perform is associated with a session, and each sub-task that needs to be performed for each task is associated with a transaction. Also, in some of these embodiments, each session has an associated session identifier and each transaction has an associated transaction identifier. As shown in FIG. 6, the control application parameters in the inner header 615 in some embodiments are the session identifier 630 and the transaction identifier 635 associated with the data message.

The inner payload 620 contains the instruction and/or data that the controller 105 sends to the configurator 135 (or the configurator sends to the controller when the message is from the configurator to the controller). The payload CRC value 625 is a value that the message recipient (i.e., the configurator 135 or the controller 105) uses for a CRC check that it performs to ensure that the payload was not corrupted, as further described below.

After the ingress pipeline's parser 150 extracts (at 505) the received message's outer header 605 and creates a header vector for the received message, one of the message-processing stages 152 of the ingress pipeline identifies (at 510) the data message as being from remote controller 105, and hence as containing control application instructions/data in its payload for the data-plane configurator 135. In some embodiments, the message-processing stage 152 identifies (at 510) the message as being from the remote controller 105 by matching one or more source address fields of the message (which were embedded in the header vector by the parser) to a flow entry in an MAU match table of that stage. This flow entry specifies an action that directs the MAU to modify the header vector to direct the received data message to a controller-message queue 180 of the traffic manager 144. By so modifying the header vector, the message-processing unit designates (at 515) the header vector as being associated with a message for the data configurator 135.

Next, at 520, another message-processing stage 152 of the ingress pipeline 140 computes an expected payload checksum. As further described below, the data-plane configurator in some embodiments examines a received message to determine whether it has been corrupted, and if so, it drops the message. The data-plane configurator 135 performs this operation to ensure reliable control application messaging in the data plane, which is susceptible to data-message transmission errors. To assist in the data-plane configurator's checksum verification operation, one MAU in the ingress pipeline computes an expected checksum value for a payload of a received message by computing a checksum of the message header and differentiating (e.g., differencing) this computed checksum from a message checksum that was stored by the remote controller in the message header. This MAU then stores this expected checksum in the message's header vector. The data configurator then computes an actual checksum value for the payload of the message and discards the message when its computed actual checksum value does not match the expected checksum value computed by the MAU, as further described below.

Figure 7:
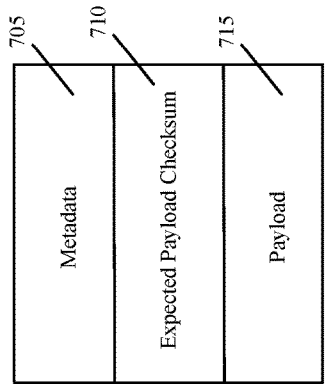
FIG. 7 illustrates the message format of a data message to or from the data-plane configurator.

At 525, the deparser of the ingress pipeline 140 reconstitutes the received data message by combining its payload with the metadata that is stored in this message's header vector, which was processed by the message-processing stages 152 of the ingress pipeline. This reconstituted message has a field that directs the traffic manager to forward this message to the controller-message queue 180. In some embodiments, the reconstituted message is no longer in the message format 600 in which it was received. Rather now, the message is in a message format used by the data-plane configurator 135. FIG. 7 illustrates an example of the format of the data message as it is provided to the data-plane configurator 135. The data message has a set of metadata fields 705. It also has an expected payload checksum 710 that was computed by the ingress pipeline 140. Lastly, it has payload 715 that is similar to the payload 610 of the received message. After 525, the process 500 ends.

The controller-message queue 180 has a finite size. When this queue is full, the traffic manager 144 drop any new data message that has to be placed in this queue. This ensures that the remote controller or another device pretending to be the remote controller cannot overwhelm the data configurator or the data plane circuit with too many configuration data messages.

From the controller-message queue 180, the TM forwards the reconstituted message to an egress pipeline associated with an egress data-plane port 112 that forwards messages to the data-plane configurator 135. As mentioned above, different data-plane ports 112 are associated with different functionalities of the forwarding element. For example, in some embodiments, one data-plane port directs messages to the configurator 135, while another data-plane port 112 recirculates the messages by directing them to one or more ingress pipelines.

To ensure reliable data plane communication between the remote controller 105 and the configurator 135, the data-plane configurator 135 in some embodiments drops remote-controller data messages that have been corrupted and/or that do not include the proper transaction identifier (e.g., the next transaction identifier in a sequence of transaction identifiers for a session identifier). In some embodiments, the data-plane configurator 135 detects whether the message has been corrupted by validating the expected payload checksum that the ingress pipeline computes, and by performing a CRC verification on the payload.

After processing a configuration message from the remote controller, the data-plane configurator in some embodiments sends an acknowledgment message to the remote controller to indicate the processing of the configuration message. In some embodiments, the remote controller executes a standard layer 4 protocol (e.g., TCP) that requires its message destinations to acknowledge receiving its data messages. Also, in some embodiments, the remote controller only accepts data messages with expected transport sequence numbers, and drops data messages from the remote controller that it receives with unexpected transport sequence numbers. Thus, in these embodiments, the data-plane configurator acknowledges receiving each data message from the remote controller by sending an acknowledgment message with the correct sequence number to the remote controller. When the data-plane configurator processes a first data message from the remote controller and has to send to the remote controller a reply second data message with payload data in response to the first data message, the data-plane configurator includes (i.e., piggybacks) its acknowledgment to the first data message in the second message.

When the data-plane configurator generates a response message to the remote controller, it supplies the response message to the message-processing stages to process and forward to the remote controller through intervening network fabric. In some embodiments, the data-plane circuit generates a first replicated message by replicating the response message for recirculating through the message-processing stages until the remote controller acknowledges receiving the response message, at which time the first replicated response message is discarded. For instance, in some embodiments, the first replicated message is stored in a rate-limited storage queue 182 in the traffic management stage and is periodically re-circulated through the data plane circuit until an MAU stage of the ingress pipeline detects an acknowledgment from the remote controller that it has received the data message from the data-plane configurator.

Figure 8:
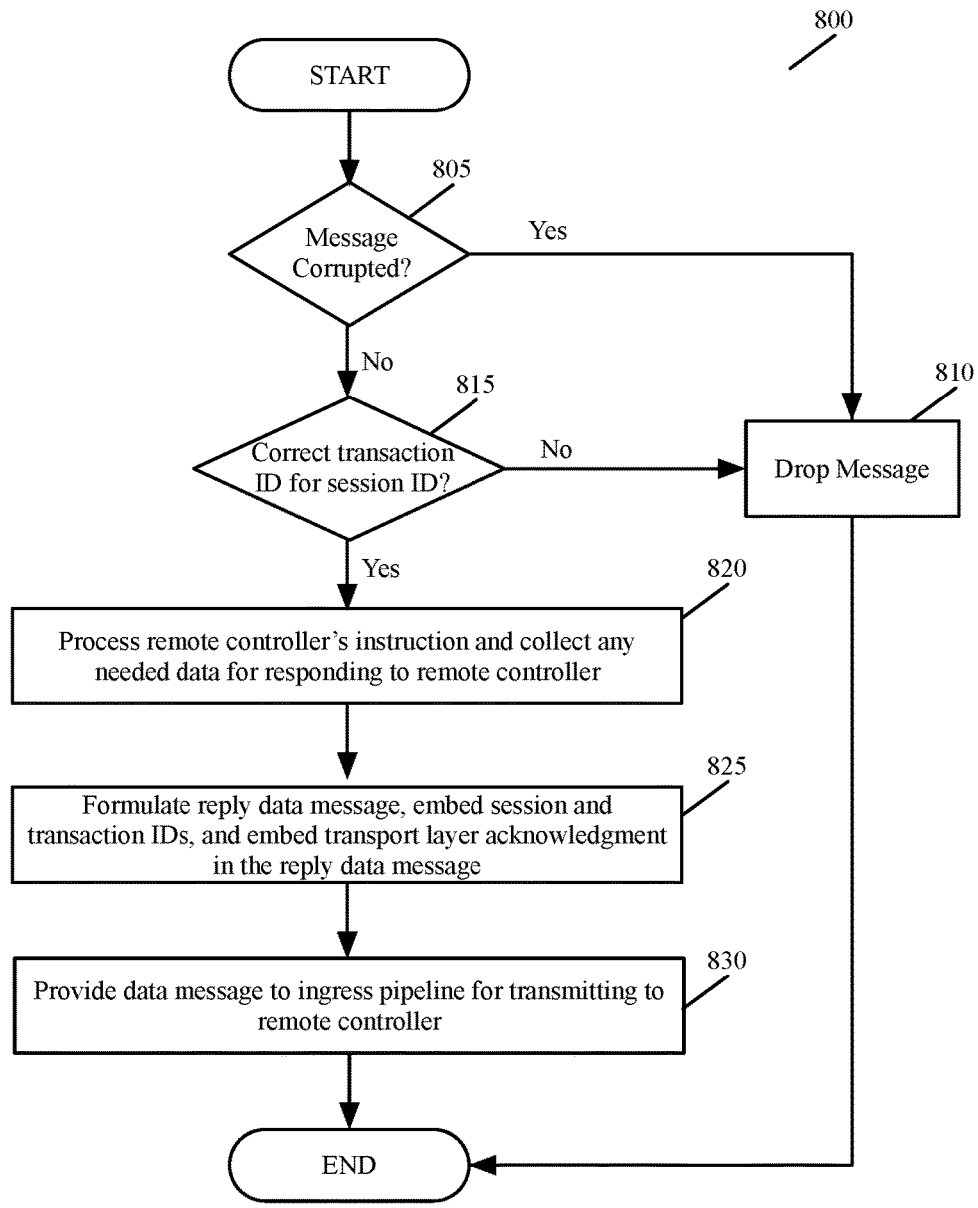
FIG. 8 presents a process that illustrates the operations that the data-plane configurator performs in some embodiments to process a data message from the remote controller.

FIG. 8 presents an exemplary process 800 that conceptually illustrates a series of operations that the data-plane configurator 135 performs in some embodiments when it receives a data message from the remote-controller queue 180 and its associated egress pipeline 142. In this example, the data-plane configurator 135 processes this data message and generates a reply message that contains data that the configurator collects in response to the received data message. However, as further described below, the configurator in some cases can process a data message from the remote controller and just provide an acknowledgment to this message.

As shown, the configurator 135 determines (at 805) whether the message has been corrupted. The configurator determines whether a data message is corrupted differently in different embodiments. For instance, in some embodiments, the data-plane configurator performs a cyclic redundancy check (CRC) operation on the received message, and drops the message when the CRC operation indicates that the message has been corrupted. As mentioned above, a data message from the remote controller 105 in some embodiments includes a payload CRC value 625 that the data configurator 135 compares with a CRC value that the configurator generates in order to determine whether the payload has been corrupted. When the computed and received CRC values match, the data configurator determines that the payload has not been corrupted. Otherwise, when these two values do not match during the CRC check, the configurator determines that the payload has been corrupted.

Also, in some embodiments, the data-plane configurator computes a checksum for the payload 620 of the received message, and then determines whether the computed checksum matches the expected payload checksum computed by the ingress pipeline. In still other embodiments, the configurator performs both checksum and CRC operations to determine whether the received message has been corrupted. When the data-plane configurator 135 determines that the received message has been corrupted (e.g., when the computed actual checksum does not match the ingress-pipeline computed expected checksum, or when the CRC verification fails), the configurator drops (at 810) the message and the process 800 ends for the received message.

When the data-plane configurator 135 determines (at 805) that the received message has not been corrupted, the configurator 135 determines (at 815) whether for the session identified by the session identifier in the received message, the transaction identifier follows the transaction identifier of the previous message from the remote controller in this session. If not, the data-plane configurator 135 drops (at 810) the message and the process 800 ends for the received message.

When the configurator 135 determines (at 815) that the transaction identifier follows the transaction identifier of the previous controller message in this session, the configurator processes (at 820) the remote-controller instruction and/or data contained in the payload of the received message. This process can include configuring one or more configurable elements in the ingress pipeline 140, egress pipeline 142 and/or TM 144. Examples of this configuration include storing ACLs in the MAUs 152 of the ingress or egress pipelines, setting scheduling parameters (e.g., output rates) for the queues in the TMs, etc. At 820, the processing of the remote-controller instruction might also involve performing other operations, such as collecting statistics stored in the data plane (e.g., counter values maintained in the data plane) and forwarding these collected statistics to the remote controller.

In some embodiments, the data-plane configurator 135 performs these configuration operations analogously to when it receives instructions from the local control plane 125 to configure the data plane, except that the registers that it now reads have been populated by a parser (not shown) of the configurator 135 that extracts data from the message that an egress port 112 directs to the configurator 135. These configuration operations in some embodiments are standard operations that data-plane configurators use to configure the data plane circuits at the direction of the local control plane. In some embodiments, the data-plane configurator 135 is a PCIe interface with the standard PCIe interface components, such as microcontroller, memory, etc.

At 820, the configurator 135 collects data in response to its processing of the received data message. Examples of such data include statistics maintained in the data plane (e.g., counter values associated with flow records in the match-action tables of the MAUs). Next, at 825, the configurator generates a response message to the remote controller. In this response, the configurator in some embodiments embeds the session identifier and the transaction identifier. In some embodiments, this transaction identifier is the transaction identifier of the message received from the remote controller. In other embodiments, the configurator only embeds the session identifier in the response message, and not the transaction identifier.

After processing a message from the remote controller, the data-plane configurator in some embodiments has to send an acknowledgment message to the remote controller to indicate the processing of the message, as the remote controller executes a standard layer 4 protocol (e.g., TCP) that requires its message destinations to acknowledge receiving its data messages. Accordingly, in the response message that it generates at 825, the configurator also embeds the transport-layer acknowledgement to the received message (i.e., the message that caused the configurator 135 to perform the process 800).

In other words, the configurator piggybacks the transport layer acknowledgement message in the control-application response message that the configurator generates in response to the message received from the remote controller. In some embodiments, the configurator also increments the layer 4 parameters (e.g., the layer 4 sequence number) in the outer header, as the remote controller uses these incremented values to verify that it has received the data messages from the forwarding element 100 in the proper sequence. The configurator 135 next supplies (at 830) the generated response message to an ingress pipeline 140 to process and forward to the remote controller through intervening network fabric. After 835, the process 800 ends.

In the example illustrated in FIG. 8, the data plane configurator 135 piggybacks its acknowledgment to the remote-controller message in its response message to the remote controller. However, in some embodiments, each time the configurator 135 processes a remote-controller message, it does not have to generate a response message with a payload for the remote controller. In such cases, the configurator 135 simply generates and sends an acknowledgment message with the correct sequence number to the remote controller. Also, in the above-described embodiments, the configurator does not increment the transaction identifier. In other embodiments, however, the configurator increments the transaction identifier, each time that it sends a response message with a payload or with an instruction to the remote controller.

To ensure reliable control-application messaging in the data plane, the data plane circuits replicate the response message, send the response message to the remote controller, and recirculate the replicated message until the remote controller acknowledges receiving the response message. To accomplish this, the ingress pipeline 140 (e.g., an MAU 152 in the ingress pipeline) that receives the response message from the configurator 135 marks the message's header vector to indicate that it has to be multi-casted by the TM 144 to both the recirculation queue 182 and the data-plane port 112 (that is associated with port 115) associated with the remote controller 105.

Figure 9:
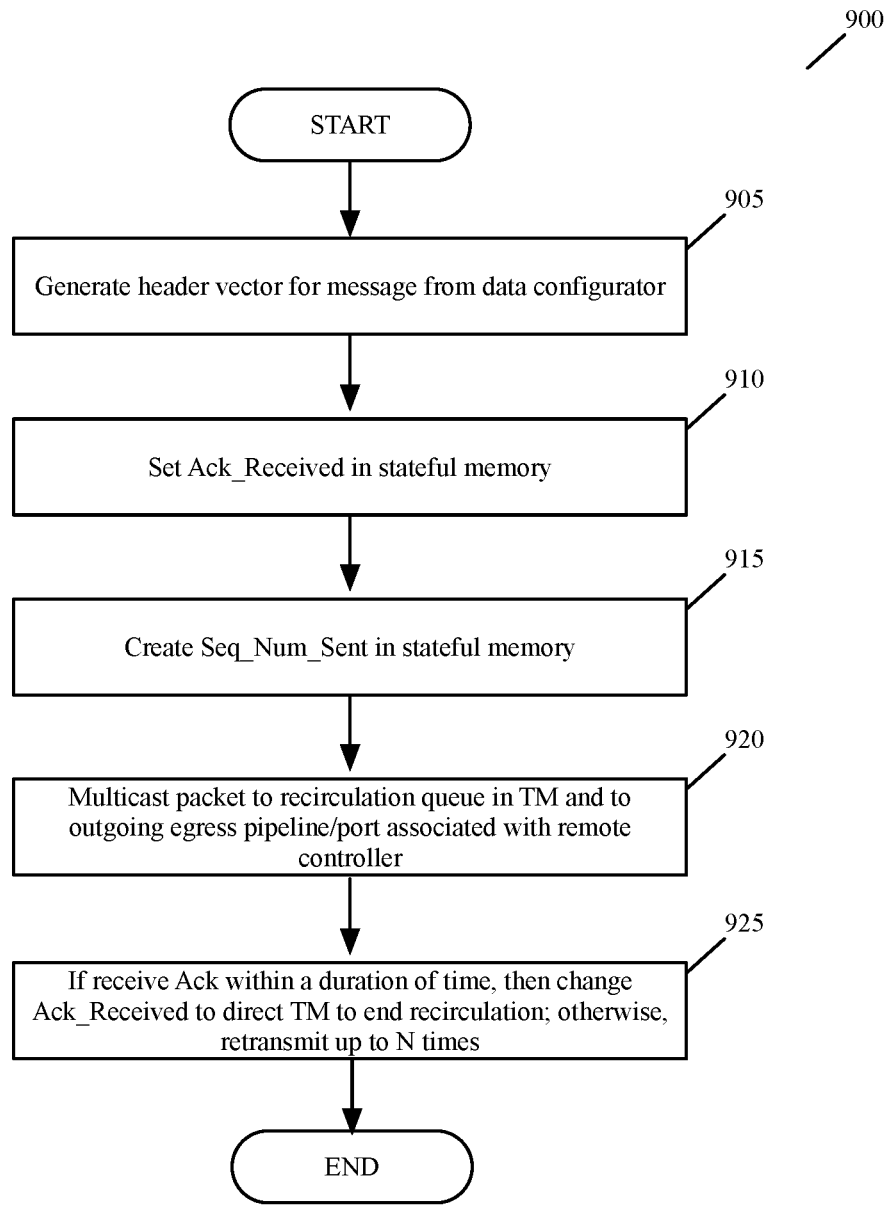
FIG. 9 presents a process that illustrates the operations that an ingress pipeline performs in some embodiments to forward a data message from the data-plane configurator to the remote controller.

FIG. 9 illustrates a process 900 that the data plane circuits perform in some embodiments to process response messages from the data-plane configurator 135. As shown, the parser 150 of the ingress pipeline 140 that receives the data message from the configurator, generates (at 905) the header vector for this message, while directing this message's payload to the deparser of the ingress pipeline. In doing this, the parser transforms the data message from a configurator format to a message-out format.

Next, at 910, one of the message-processing stages 152 creates in a stateful table 315 an Ack_Received Boolean variable for the data message, and sets the value of this variable to False. At 915, the same or different message-processing stage creates in the same or different stateful table 315 a Seq_Num Sent variable, which corresponds to the sequence number assigned to the response message from the data-plane configurator 135. This stored sequence number is used in some embodiments to determine whether the data plane 120 subsequently receives a layer-4 acknowledgment reply to its response message.

At 920, a message-processing stage 152 marks the header vector to indicate that the received configurator message should be replicated and re-circulated by the TM. Once the deparser of the ingress pipeline (that processes the response message from the configurator) combines the header vector and the payload of this message, the TM gets the message, and from the marked multi-cast fields in this message, determines that it has to multi-cast this message to both the recirculation queue 182 and the data-plane port 112 associated with the remote controller 105. The TM then directs the received message to the egress queue 410 that is associated with the data-plane port 112 that is associated with (e.g., that is directly or indirectly communicatively connected) with the remote controller 105. In some embodiments, the data message format 600 of FIG. 6 is the format of the message that is sent to the remote controller 105 with the session ID, transaction ID, checksum value and CRC values provided by the data-plane configurator 135.

The TM also replicates the received message and directs this replicated message to the TM's recirculation queue 182 (which in some embodiments is another egress queue 410 of the TM). The recirculation queue in some embodiments is a rate-limited queue that stores the messages that it receives for a time period that can be configured by the configurator 135. Storing the replicated message in the rate-limited queue allows the data plane to reduce the rate at which the replicated message recirculates through the data plane 120 while waiting for the remote controller 105 to acknowledge receiving the message from the configurator 135. The TM retrieves the re-circulated message from the recirculation queue 182 periodically based on the configured output rate of this queue, and directs this message to egress queue 410 that is associated with the data-plane port 112 that recirculates its output back to an ingress pipeline 140.

The data plane process 900 transitions from 920 to 925, where it remains until it receives an acknowledgment from the remote controller that it has received the configurator's message, it determines that it has to retransmit the configurator's message, or it determines that it has to stop the recirculation and retransmission as the remote controller has failed to a particular number of retransmitted messages. When it receives an acknowledgement message, the process 900 uses the stored sequence number (that it previously stored at 915) to determine that the acknowledgement message was for the response message forwarded at 920.

In some embodiments, the data plane does not determine whether it has to retransmit the configurator's message to the remote controller, but rather informs the configurator 135 that the remote controller has not acknowledged a previously transmitted message, and the configurator has to regenerate the data message for retransmission. The data plane 120 in some embodiments so informs the configurator by having the MAU stage that maintains the recirculation count for the replicated message, mark the header vector for the replicated message to direct the traffic manager to direct the replicated message to the data plane configurator, or to drop the replicated message and direct another message to the data plane configurator. In notifying the data plane configurator 135, the traffic manager in some embodiments stops recirculating the replicated packet through the data plane, as the data plane configurator has to regenerate the message to the remote controller.

When the remote controller sends a valid acknowledgement to the configurator's message, a message-processing stage 152 of the ingress pipeline that processes the message from the controller, detects this acknowledgement and changes the Ack_Received field in the stateful memory 315 to True for the configurator message associated with the received acknowledgement. In some embodiments, the same ingress pipeline 140 processes all the data messages from the remote controller and the original and re-circulated messages from the data configurator 135, as only the remote controller is implemented by one server that connects to the forwarding element 100 through one ingress port 115 that is associated with one ingress data-plane port 112 for message from the remote controller. However, even in embodiments in which the remote controller is implemented by a cluster of servers, one ingress pipeline 140 processes all the data messages from and to a remote controller during one session (as identified by one session identifier) because one session is only managed by one server in the remote controller cluster. As such, these embodiments do not have to address receiving message acknowledgments from a remote controller in a different ingress pipeline than the ingress pipeline through which the re-circulated messages pass through.

In some embodiments, the message-processing stage 152 disregards an acknowledgement message when sequence number in this message is smaller than the Seq_Num Sent that the data plane circuits stored for the configurator's data message to the remote controller 105. This is because the lower sequence number indicates that the acknowledgement message is a prior message that acknowledges a prior message from the configurator. When the message-processing stage 152 disregards an acknowledgement message, it marks the header vector for this message for dropping.

The next time that the re-circulated, replicated message passes through a message-processing stage that checks the stateful memory 315, the message-processing stage checks the Ack_Received field, determines that the acknowledgment has been sent, and then marks the header vector for this re-circulated, replicated message for dropping. When processing the reconstituted message with this header vector, the TM then analyzes the field marked up to indicate that the replicated message should be dropped and then drops this message instead of storing it in the recirculation queue 182. In other embodiments, a message-processing stage that processes the re-circulated message drops this message when it detects that the stateful table stores an Ack_Received value that is True. After 925, the process ends.

By allowing the data plane circuits of a forwarding element to be programmed by a remote-controller through in-band data messages, some embodiments of the invention improve the fault-tolerance of the forwarding element because the forwarding element no longer has to be taken offline the moment that its control plane processor fails. Also, this remote data-plane programmability of the forwarding element allows the forwarding element to use no control-plane processor or to use simpler control-plane processor(s). This, in turn, reduces the cost and complexity of the forwarding element.

While the invention has been described with reference to numerous specific details, one of ordinary skill in the art will recognize that the invention can be embodied in other specific forms without departing from the spirit of the invention. Accordingly, one of ordinary skill in the art would understand that the invention is not to be limited by the foregoing illustrative details, but rather is to be defined by the appended claims.

The invention claimed is:

1. For a forwarding element, a data plane circuit comprising:
    a plurality of ingress and egress message-processing pipelines each with a plurality of configurable message-processing stages to process data messages received by the forwarding element in order to forward at least a subset of the data messages to other elements in a network;
    a data-plane configurator to configure at least a set of the configurable message-processing stages of the pipelines in response to configuration data messages that are received, from a remote controller, in-band with other received data messages; and
    a traffic management stage comprising (i) ingress queues to store data messages received from the ingress pipelines and (ii) egress queues to store data messages before being supplied to the egress pipelines, said egress queues comprising at least one particular storage queue to store a first message that the data-plane configurator sends to the remote controller and that is recirculated through a set of message-processing pipelines a plurality of times until an acknowledgment second message is received from the remote controller to acknowledge the first message,
    wherein the data plane configurator uses the configuration data messages to write a set of flow entries to a set of message processing stages,
    wherein the particular storage queue is a rate-limited egress queue with a lower throughput rate than the throughput rate of the other queues.

2. The data plane circuit of claim 1, wherein
    the traffic management stage is between the ingress and egress processing pipelines.

3. The data plane circuit of claim 2, wherein the traffic management stage further comprises a crossbar switching fabric for forwarding messages from ingress pipelines to egress pipelines based on parameters that the ingress processing pipelines specify for the messages while processing the messages.

4. The data plane circuit of claim 2, wherein the particular storage queue is a recirculation queue, wherein at least one particular ingress or egress queue has an associated configurable quality of service (QoS) parameter that determines a throughput of the particular queue.

5. The data plane circuit of claim 4, wherein the recirculation queue has the lower throughput rate in order to achieve a lower rate for recirculating the first message through the set of message-processing pipelines.

6. The data plane circuit of claim 2, wherein
at least one message-processing stage of at least one particular ingress pipeline maintains statistics relating to a number of times that the first message has recirculated through the particular ingress pipeline; and
at least one message-processing stage of at least the particular ingress pipeline notifies the traffic management stage to generate a notification to the data-plane configurator that the acknowledgment second message has not been received after the first message has been recirculated a particular number of times.

7. The data plane circuit of claim 6, wherein the traffic management stage discards from the particular storage queue the first message when it receives the notification from the message-processing stage.

8. The data plane circuit of claim 6, wherein after receiving the notification from the traffic management stage, the data-plane configurator reproduces data for the configurable message-processing pipelines to send as another first message to the remote controller, said other first message stored in the particular storage queue of the traffic management stage for recirculation through configurable message-processing pipelines.

9. The data plane circuit of claim 1, wherein the first message comprises an acknowledgement of an earlier third message that the remote controller sent to the data-plane configurator before the first message was generated.

10. The data plane circuit of claim 1, wherein the other elements in the network comprises at least one other forwarding element in the network or a destination machine in the network.

11. The data plane circuit of claim 1, wherein the remote controller is a physically separate device than the hardware forwarding element and sends the configuration data messages to the hardware forwarding element through at least one intervening forwarding element.

12. A hardware forwarding element comprising:
a data plane circuit comprising a plurality of ingress and egress message-processing pipelines each with a plurality of configurable message-processing stages and a data-plane configurator;
the plurality of configurable message-processing stages to process data messages received by the forwarding element in order to forward at least a subset of the data messages to other elements in a network;
the data-plane configurator to configure at least a set of the configurable message-processing stages of the pipelines in response to configuration data messages that are received, from a remote controller, in-band with other received data messages; and
a traffic management stage comprising (i) ingress queues to store data messages received from the ingress pipelines and (ii) egress queues to store data messages before being supplied to the egress pipelines, said egress queues comprising at least one particular storage queue to store a first message that the data-plane configurator sends to the remote controller and that is recirculated through a set of message-processing pipelines a plurality of times until an acknowledgment second message is received from the remote controller to acknowledge the first message,
wherein the data plane configurator uses the configuration data messages to write a set of flow entries to a set of message processing stages,
wherein the particular storage queue is a rate-limited egress queue with a lower throughput rate than the throughput rate of the other queues.

13. The hardware forwarding element of claim 12, wherein the remote controller is a physically separate device than the hardware forwarding element and sends the configuration data messages to the hardware forwarding element through at least one intervening forwarding element.

14. The hardware forwarding element of claim 12, wherein
the traffic management stage is between the ingress and egress processing pipelines.

15. The hardware forwarding element of claim 14, wherein the traffic management stage further comprises a crossbar switching fabric for forwarding messages from ingress pipelines to egress pipelines.

16. The hardware forwarding element of claim 14, wherein the particular storage queue is a recirculation queue, wherein at least one particular ingress or egress queue has an associated configurable quality of service (QoS) parameter that determines a throughput of the particular queue.

17. The hardware forwarding element of claim 16, wherein the recirculation queue has the lower throughput rate in order to achieve a lower rate for recirculating the first message through the set of message-processing pipelines.

18. The hardware forwarding element of claim 14, wherein
at least one message processing stage of at least one particular ingress pipeline maintains statistics relating to a number of times that the first message has recirculated through the particular ingress pipeline; and
at least one message processing stage of at least the particular ingress pipeline notifies the traffic management stage to generate a notification to the data-plane configurator that the acknowledgment second message has not been received after the first message has been recirculated a particular number of times.

19. The hardware forwarding element of claim 18, wherein the traffic management stage discards from the particular storage queue the first message when it receives the notification from the message processing stage.

20. The hardware forwarding element of claim 12, wherein the first message comprises an acknowledgement of an earlier third message that the remote controller sent to the data-plane configurator before the first message was generated.

* * * * *